United States Patent
Schiefer

(10) Patent No.: US 6,953,432 B2
(45) Date of Patent: Oct. 11, 2005

(54) IMAGER COVER-GLASS MOUNTING

(75) Inventor: Eugene C. Schiefer, Liverpool, NY (US)

(73) Assignee: Everest Vit, Inc., Flanders, NJ (US)

( * ) Notice: Subject to any disclaimer, the term of this patent is extended or adjusted under 35 U.S.C. 154(b) by 90 days.

(21) Appl. No.: 10/441,727

(22) Filed: May 20, 2003

(65) Prior Publication Data

US 2004/0233318 A1 Nov. 25, 2004

(51) Int. Cl.$^7$ .................................................. A61B 1/06
(52) U.S. Cl. ...................... 600/175; 600/176; 600/127; 600/129
(58) Field of Search .................. 600/109, 121–125, 600/127, 129, 176; 348/340; 359/642

(56) References Cited

U.S. PATENT DOCUMENTS

| | | | |
|---|---|---|---|
| 4,895,138 A | * | 1/1990 | Yabe ........................... 600/110 |
| 4,979,498 A | | 12/1990 | Oneda et al. |
| 5,377,669 A | | 1/1995 | Schulz |
| 5,418,566 A | * | 5/1995 | Kameishi .................... 348/294 |
| 5,733,244 A | | 3/1998 | Yasui et al. |
| 5,749,827 A | * | 5/1998 | Minami ....................... 600/109 |
| 5,779,625 A | | 7/1998 | Suzuki et al. |
| 5,788,628 A | | 8/1998 | Matsuno et al. |
| 5,821,532 A | | 10/1998 | Beaman et al. |
| 5,951,464 A | | 9/1999 | Takahashi et al. |
| 5,993,381 A | | 11/1999 | Ito |
| 6,139,489 A | | 10/2000 | Wampler et al. |
| 6,172,361 B1 | | 1/2001 | Holberg et al. |
| 6,184,514 B1 | | 2/2001 | Rezende et al. |
| 6,313,456 B1 | | 11/2001 | Miyashita et al. |
| 6,428,650 B1 | | 8/2002 | Chung |
| 6,472,247 B1 | | 10/2002 | Andoh et al. |
| 6,483,535 B1 | | 11/2002 | Tamburrino et al. |
| 6,494,739 B1 | | 12/2002 | Vivenzio et al. |
| 6,547,721 B1 | * | 4/2003 | Higuma et al. ............. 600/133 |
| 2003/0067544 A1 | * | 4/2003 | Wada ....................... 348/208.7 |

FOREIGN PATENT DOCUMENTS

| | | |
|---|---|---|
| JP | 11249031 | 9/1999 |
| JP | 2000107120 | 4/2000 |
| JP | 2001095757 | 4/2001 |

* cited by examiner

Primary Examiner—Beverly M. Flanagan
Assistant Examiner—Matthew J Kasztejna
(74) Attorney, Agent, or Firm—Wall Marjama & Bilinski LLP

(57) ABSTRACT

Devices and methods for protecting components of imaging devices are provided. In the illustrative embodiment, a plano-concave protective cover is provided which is bonded to an imager window by applying a thick, quick-setting adhesive to the exterior of the cover and of the imager window.

35 Claims, 2 Drawing Sheets

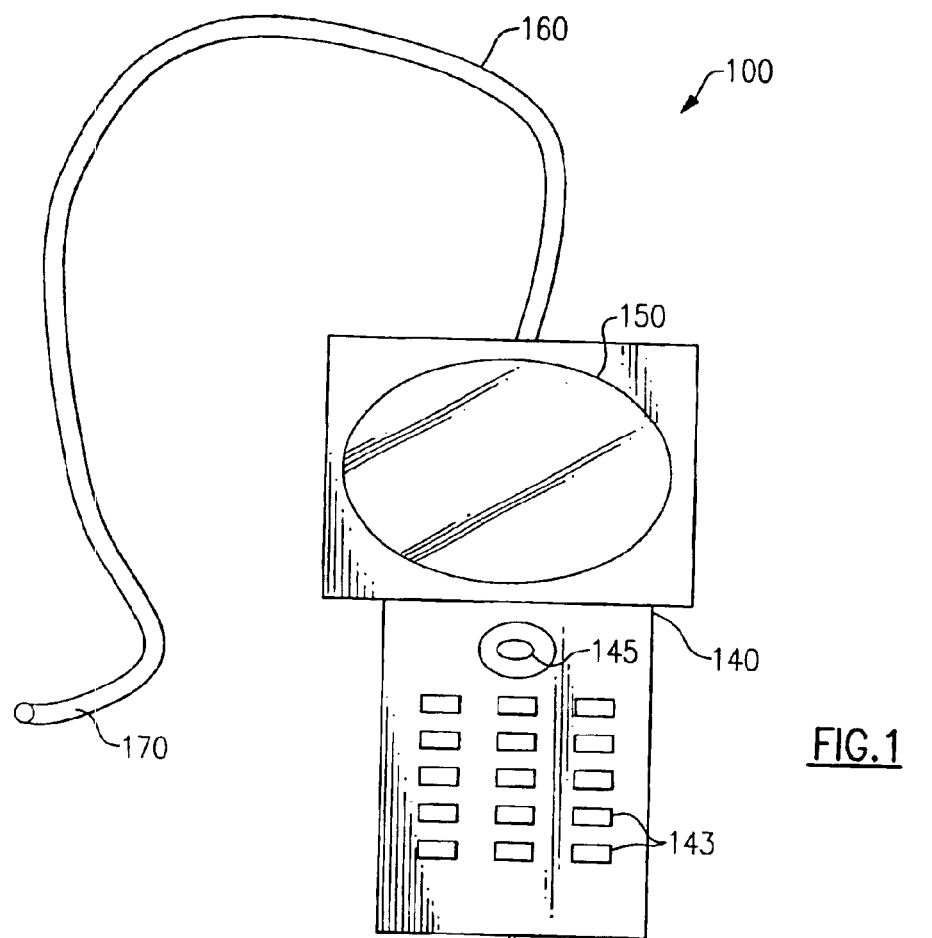
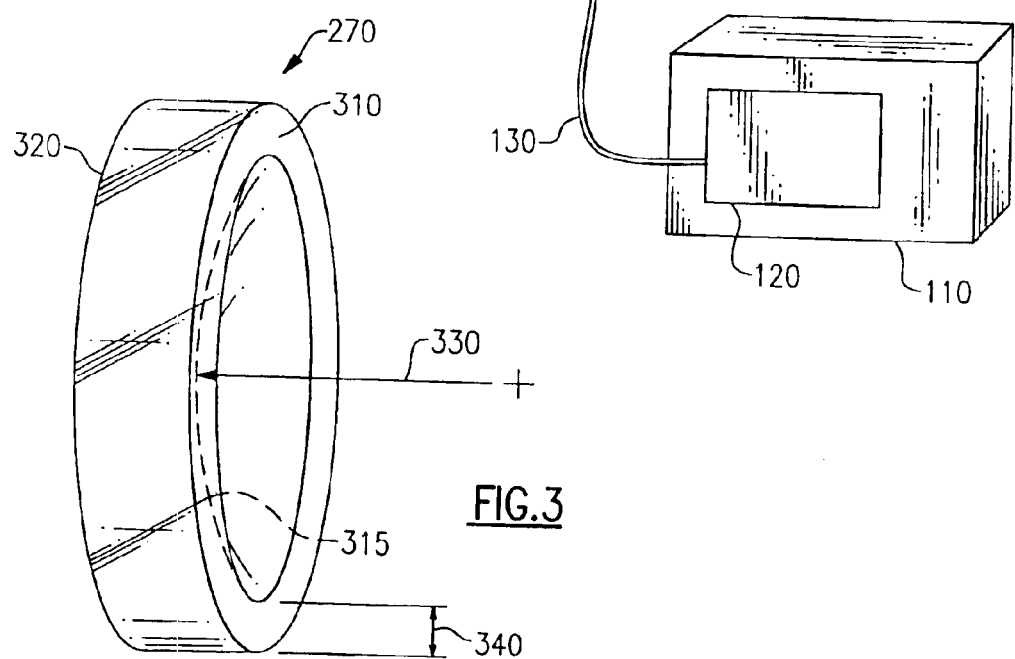

IMAGER COVER-GLASS MOUNTING

CROSS REFERENCE TO RELATED APPLICATIONS

None.

FIELD OF THE INVENTION

The invention relates generally to protective covers for imaging devices.

BACKGROUND OF THE INVENTION

Electronic-type imaging devices of the type used, for example, in microscopes, telescopes, camcorders, thermal imagers, digital cameras, and especially with digital inspection systems (e.g., borescopes, and endoscopes), often are subjected to harsh physical operating conditions, and must embody a degree of survivability, in terms of mechanical durability, temperature tolerance, etc., which exceeds that required for similar electronics designed to operate in more benign environments, such as in clean rooms and climate-controlled office environments. In addition, these "hearty" imaging devices must be protected against environmental debris, such as dirt, dust, chemicals, and corrosive fluids, which might damage the optical elements (typically located in a tip of the imaging device) associated with the imaging devices introduced into hostile environments. "Optical elements" include well-known components used in imaging devices, such as miniature electronic image sensors (of the type, for example, used in CCD-type or CMOS-type imagers), mirrors, light sources (such as LEDs and laser diodes), and lenses.

In the past, windows, lenses, CHL assemblies, or other imaging portals leading to the optical elements of an imager (hereinafter, "imager window") located in a tip of an imaging device have been afforded a modicum of protection by affixing a flat, optically transmissive element onto the imager window, such as a flat glass disk or plate. The flat element typically is bonded to the imager window using a UV adhesive, i.e., an adhesive cured under ultraviolet light during manufacturing. UV adhesives typically are used because of their generally quick cure times which, in turn, allow for a relatively short manufacturing step associated with the bonding.

This method of protecting the imager window, however, creates certain disadvantages with regard to the operation of the imaging device. For example, the use of a flat optical element bonded to an imager window, with UV adhesive interposed between the optical element and the imager window, gives rise to Newton's rings, a phenomenon observed when two materials with differing refractive indices are in close contact with each other. In practice, the presence of these rings (which typically are a series of concentric rings surrounding a central dark spot) reduces the image quality produced by the imaging device. Furthermore, the UV adhesives used to bond the flat optical element to the imager window, when stressed mechanically or thermally, tend to fail and crack, creating unwanted distortions and artifacts in the image produced by the imaging device. The failure of these adhesives also allows the flat optical element to disengage from the imager window, losing any protective benefit conferred by the presence of the flat optical element.

One prior art approach to addressing these problems has been to interpose bonding pads between the optical element and the imager window, and then to bond the optical element to the bonding pad in such a manner as to create a seal between the bonding pad and the optical element. That approach, however, is disadvantageous in that it requires additional materials and time-consuming alignment and bonding steps with regard to the bonding pads.

Another prior art approach has been to interpose adhesive, in the form of strips of preformed thermoplastic or thermosetting adhesives, between the optical element and the imager window at the edges where the optical element and imager window contact each other. However, this approach also is flawed in that the preformed adhesive strips cannot be tightly controlled when melted under heat, allowing the adhesive to "run" into the viewing area of the imager window.

SUMMARY OF THE INVENTION

It is the object of this invention to provide a cover for an imager window assembly which overcomes the disadvantages of prior art methods of protecting the imager window.

In one aspect of the invention, an imager window cover assembly is provided including an optically transmissive cover element mounted to an imager window by means of a mounting element applied to the exterior of the imager window cover and the imager window so that light traveling toward an imager window does not pass through the mounting element.

In another aspect of the invention, an imager window cover assembly is provided which eliminates image distortion attributable to Newton's rings.

In another aspect of the invention, an imager window cover assembly is provided which does not create visual distortion upon failure of an adhesive.

In a further aspect of the invention, an imager window cover assembly is provided which is less likely than prior art imager window covers to disengage from the imager window.

In yet another aspect of the invention, an imaging device is provided with an imager window cover element which protects optical elements of the imaging device from adverse environmental conditions.

BRIEF DESCRIPTION OF THE DRAWINGS

FIG. 1 is an imaging device according to the invention;

FIG. 3 is a side perspective view of an imager window cover element according to the invention.

DETAILED DESCRIPTION OF THE PREFERRED EMBODIMENT

Figure 2:
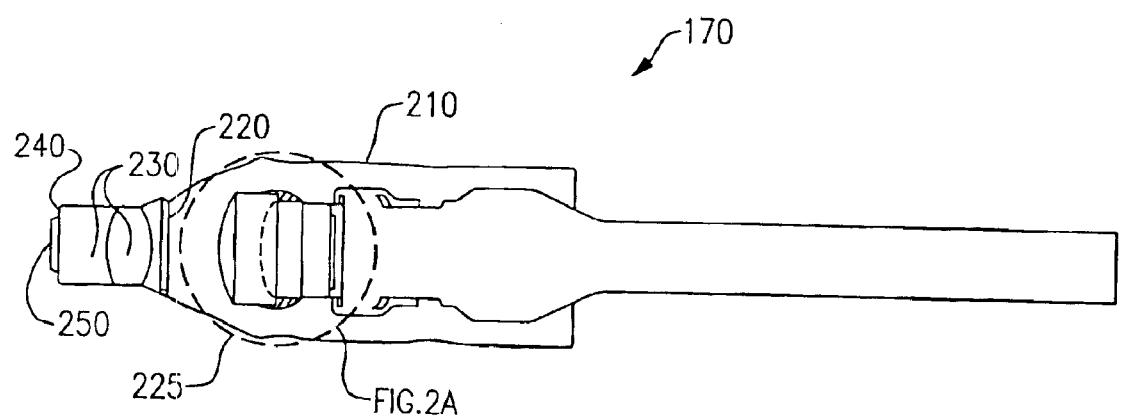
FIG. 2 is an enlarged view of a distal end of the imaging device of FIG. 1.

It is to be understood that the invention is not limited in its application to the details of construction and arrangements of components set forth herein in the detailed description of the preferred embodiment or illustrated in the drawings. The invention is capable of other embodiments and of being practiced or being carried out in various ways.

Referring to FIG. 1, a typical imaging device 100 (a boroscope in the illustrative embodiment) according to the invention is illustrated, such as is sold by Everest VIT® of Flanders, N.J. Such a device could include, as shown in the illustrative embodiment, a portable shipping/operating case 110, that includes a power supply 120 for the device and a light source, such as a metal halide arc lamp (not shown). The shipping/operating case 100 is shown in operative communication with a handpiece 140 by means of a cable 130. The handpiece 140 can include, by way of example, an LCD monitor 150 (which displays images seen by the imaging device), a joystick control 145 (for articulating a distal end 170 of the imaging device 100), and a button set 143 (for accessing measurement, digital, and measurement controls associated with the imaging device 100). The handpiece 140 also is connected to an insertion tube 160, which terminates in a distal end 170. As used herein, the term "distal" shall mean "in the direction of the tip of the boroscope, furthest from the handpiece 140." The insertion tube 160 can be sized according to the desired application, by varying a diameter and a length of the insertion tube 160. The insertion tube 160 can include, for example, a durable tungsten braid overlaying a stainless steel monocoil for crush resistance, and one or more layers of a polyurethane sealant for protection from liquids and vapors. The interior of the insertion tube 160 (not shown) can include standard imager lines and communication/control means, such as fiber-optic cables and articulation wires.

An enlarged view of the distal end 170 of the imaging device 100 described herein is illustrated in FIG. 2. The distal end 170 includes a camera housing 210 surrounding a camera assembly comprising, in the illustrative embodiment, an objective window 250, an aperature 240, an acromat 230, a light baffle 220, and an imaging assembly 225. Such camera assemblies (without the inventive cover assembly) are well-known, and commercially available from the Semiconductor Business Division of Sony Electronics Inc.

Figure 2A:
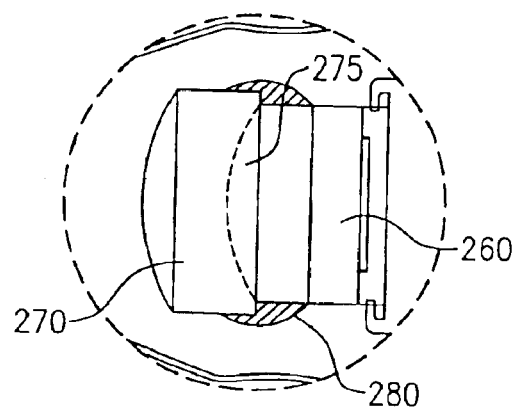
FIG. 2A is an enlarged view of the distal end of FIG. 2.

An enlarged view of the imaging assembly 225 is shown in FIG. 2A. The imaging assembly generally includes an imager cover element 270 (described in greater detail in relation to FIG. 3) and a CHL assembly 260. As used herein, "CHL" is an acronym for "Chip Hybrid Lead", which refers generally to a imager ("chip"), the electronics which amplify the signal from the imager ("hybrid"), and a harness which carries the imager signal back to an imaging device ("lead"). The cover element 270 is fitted to the CHL assembly 260 by a mounting element 280. In the illustrative embodiment, the mounting element 280 is shown as an adhesive portion deposited in a bead-like pattern on a peripheral, exterior edge of imager cover element 270 and an exterior edge of CHL assembly 260 in the illustrative embodiment of FIG. 2A. One of ordinary skill will appreciate, however, that the mounting element could comprise, instead of adhesive, tapes (such as MYLAR® tape), shrink tubes, and mechanical mountings. In the illustrative embodiment, the mounting element 280 (which shall be referred to as an "adhesive portion" in connection with the illustrative embodiment) preferably is a thick adhesive, to prevent the adhesive from being interposed between (or "running" into) the space between the imager cover element 270 and the CHL assembly 260 during manufacture. By "thick" what is meant is an adhesive having a viscosity of between about 100,000 centipoise and about 1,000,000 centipoise. The prevention of, and lack of, adhesive (or any other desired mounting element) between the imager cover element 270 and the CHL assembly 260 is an important feature of the invention, as adhesive between the two might crack (leading to degraded image quality) or fail (leading to loss of the imager cover element 270).

The imager cover element 270, as illustrated in FIG. 2A and FIG. 3, is shaped to create an air gap 275 between the imager cover element 270 and the CHL assembly 260. This air gap provides a sufficient distance so that the imager cover element 270 and the CHL assembly 260 are not close enough for any differences in their respective refractive indices to give rise to Newton's rings.

The adhesive portion 280 also preferably is a quick-cure adhesive, so that the application of the adhesive portion 280 does not become a time-consuming step during the manufacture of the imaging assembly 225. By "quick" what is meant is an adhesive that is cured within about 15 minutes of application. Generally, epoxy adhesives, and in particular HYSOL® 608, offered by Loctite Corporation, have been found to be a well-suited for the purposes of bonding the imager cover element 270 to the CHL assembly 260.

Referring to FIG. 3, the imager cover element 270 is shown, in the illustrative embodiment, to have a plano-concave shape, though the invention equally may be practiced using other shapes, such as convex-concave or concave-concave. In the illustrative embodiment, the imager cover element 270 has a distal, non-imager facing side 320, which is shown as being planar, and a proximal, imager facing side 310, which is shown having a concave indentation 315. The concave indentation 315, when paired with the CHL assembly 260, creates the tight fit as well as the air gap 275 defined between the imager cover element 270 and the CHL assembly 260, as shown in FIG. 2A. The concave indentation 315 prevents the formation of Newton's rings by preventing a surface to surface orientation between the imager cover element 270 and the viewable area of the CHL assembly 260, as is seen in (prior art) cover assemblies employing a flat cover element. The concave indentation 315 also serves to prevent the externally applied adhesive portion from being drawn into the air gap 275 by means of capillary action. In the illustrative embodiment, the indentation 315 can be described by a radius of curvature 330 which is about equal to the focal length of the imaging device 100 (which in the case of the illustrative boroscope is about 3.00 mm+/−0.03 mm). The radius of curvature, however, is not a vital feature of the present invention, and any radius of curvature between the focal length of the device and infinite could be used, so long as enough of the air gap 275 is maintained to prevent the formation of Newton's rings.

The imager cover element 270 is achromatic in the illustrative embodiment, though the imager cover element could be pigmented or otherwise treated to filter out certain wavelengths of light if desired. If desired, the imager cover element 270 also could be machined to provide an additional, optical modification of light coming entering the CHL assembly 260, i.e., the imager cover element 270 could act as a lens. The imager cover element 270 could be fabricated from any desired, optically-transmissive material, such as glass, plastic, crystal, or composites suitable for optical uses. Notably, the short distance between the imager cover element 270 and the CHL assembly 260 ensures that any environmental debris that is deposited on the distal end 320 of the imager cover element 270 remains out of focus, and does not materially alter any image that is subsequently generated by the CHL assembly 260.

The imager cover element 270 is shaped so that the edges of the cover element sealingly engage the edges of the CHL assembly 260 to form a tight fit. By "tight," what is meant is that the edges are shaped in a manner so that when the adhesive portion 280 (or other selected mounting element) is applied to the exterior of cover element 270 and the CHL assembly 260, as shown in FIG. 2A, the adhesive portion 280 (or other selected mounting element) is unable to enter the air gap 275. After the adhesive portion 280 sets, a seal is formed comprising the adhesive portion 280, and the tight fit between the edges of the imager cover element 270 and the CHL assembly 260, preventing environmental debris from entering the air gap 275 and affecting the CHL assembly 260.

While the invention has been described in conjunction with a preferred embodiment, it is evident that numerous alternatives, variations, and modifications will be apparent to those skilled in the art in light of the foregoing description. Thus, it is understood that the invention is not to be limited by the foregoing illustrative details.

Equivalents

While the invention has been particularly shown and described with reference to specific embodiments, it should be understood by those skilled in the art that various changes in form and detail may be made therein without departing from the spirit and scope of the invention as defined by the appended claims.

What is claimed is:

1. A cover assembly for an imager window of an imaging device, said imaging device having a focal length, the imager window including at least one optically active region, said cover assembly comprising:
    an optically transmissive cover element having an imager facing side and at least one edge shaped to form a tight fit with an edge of the imager window; and
    a mounting element substantially disposed on an exterior edge of the cover element and on an exterior edge of the imager window so as to hold the at least one edge of the cover element to the edge of the imager window in a tight fit, and to form a seal between the cover element and the imager window, and
    wherein said imager facing side is contiguous and non-planar and is shaped to create an enclosed air gap between the cover element and the at least one optically active region of the imager window.

2. The cover assembly of claim 1, wherein the cover element is shaped in a plano-concave manner and wherein said imager facing side has a radius of curvature to create the air gap.

3. The cover assembly of claim 1, wherein the cover element is shaped in a convex-concave manner and wherein said imager facing side has a radius of curvature to create the air gap.

4. The cover assembly of claim 1, wherein the cover element is shaped in a concave-concave manner and wherein said imager facing side has a radius of curvature to create the air gap.

5. The cover assembly of claim 2, wherein said imager facing side of the cover element has a radius of curvature of about the focal length of the imaging device.

6. The cover assembly of claim 2, wherein said imager facing side of the cover element has a radius of curvature sufficient to prevent the formation of Newton's rings.

7. The cover assembly of claim 2, wherein said imager facing side of the cover element has a radius of curvature which is greater than the focal length of the imaging device.

8. The cover assembly of claim 1, wherein said imager facing side of the cover element is shaped to create a gap sufficient to prevent the presence of Newton's rings.

9. The cover assembly of claim 1, wherein the mounting element is selected from the group of mounting elements consisting of: adhesives, tapes, shrink tubes, and mechanical mountings.

10. The cover assembly of claim 1, wherein the mounting element is an adhesive.

11. The cover assembly of claim 10, wherein the adhesive is an epoxy.

12. The cover assembly of claim 11, wherein the adhesive is a fast-curing epoxy.

13. The cover assembly of claim 10, wherein the adhesive is thick.

14. The cover assembly of claim 1, wherein the imager window is part of an electronic-type imaging device.

15. The cover assembly of claim 14, wherein the imager window is part of a CCD-type imager.

16. The cover assembly of claim 14, wherein the imager window is part of a CMOS-type imager.

17. The cover assembly of claim 1, wherein the imager window is part of an imaging device selected from the group of imaging devices consisting of: microscopes, camcorders, thermal imagers, telescopes, digital cameras, endoscopes, and boroscopes.

18. The cover assembly of claim 1, wherein the cover element is constructed from a material selected from group of materials consisting of: glass, plastics, crystals, and composites.

19. A cover assembly for an imager window of an imaging device comprising:
    a cover element having at least one edge shaped to form a tight fit with an edge of the imager window; and
    a mounting element disposed on a peripheral edge of the cover element and on a peripheral edge of the imager window so as to hold the at least one edge of the cover element to the edge of the imager window, and form a seal between the cover element and the imager window,
    wherein the cover element is oriented so that a portion of the cover element creates an enclosed air gap between the cover element and the imager window.

20. The cover assembly of claim 19, wherein the cover element is plano-concave, convex-concave, or concave-concave.

21. The cover assembly of claim 19, wherein the mounting element is an adhesive such as an epoxy.

22. The cover assembly of claim 19, wherein the imager window is chosen from the group of imager windows consisting of: windows, lenses, and CHL assemblies.

23. The cover assembly of claim 19, wherein the air gap is of sufficient size to prevent the presence of Newton's rings.

24. The cover assembly of claim 19, wherein the cover element is a lens.

25. A method for protecting an imager window of an imaging device, comprising the steps of:
    providing an optically transmissive cover element having at least one exterior edge;
    applying a mounting element to an exterior edge of the cover element and to an exterior edge of the imager window,
    wherein the cover element is shaped to create an air gap between the cover element and the imager window and to enclose the imager window, and
    wherein the mounting element forms a seal over the exterior edge of the cover element and the exterior edge of the imager window.

26. The method of claim 25, wherein the cover element is of plano-concave, concave-concave, or convex-concave.

27. The method of claim 25, wherein the mounting element is selected from the group of mounting elements consisting of: adhesives, tapes, shrink tubes, and mechanical mountings.

28. The method of claim 25, wherein the presence of the air gap prevents the creation of Newton's rings.

29. The method of claim 25, wherein the imaging device is selected from the group of imaging devices consisting of: microscopes, camcorders, thermal imagers, telescopes, digital cameras, endoscopes, and boroscopes.

30. The cover assembly of claim 1, wherein the cover element functions as a lens.

31. An imaging device comprising:

an electronic imager;

a window attached to said imager, said window having an external surface;

an imager window cover plate having an imager facing surface, and a lateral edge surface;

a mounting element disposed on said lateral edge surface of the cover plate and said external surface of the imager window and configured to hold said imager window cover plate and said imager window adjacent to each other; and an enclosed air gap having a shape at least partially defined by a radius of curvature formed between the imager window and the imager window cover plate when said imager window and said imager window cover plate are held adjacent to each other by said mounting element.

32. An endoscope apparatus comprising:

a power supply unit;

an imager and an image viewing display;

an insertion tube having a distal end including a camera housing;

an optical system and an imaging assembly located in said camera housing;

an imager assembly having an imager window and a cover plate, where said cover plate is secured to a lateral edge surface of said imager window via a mounting element, and wherein said cover plate has a non-planar imager facing surface that forms an enclosed air gap that is also adjacent to the imager window.

33. The endoscope apparatus of claim 32 wherein the optical system and the imaging assembly are separated along an optical axis that is substantially perpendicular to said imager window.

34. The endoscope apparatus of claim 32 wherein said cover plate is a lens.

35. The endoscope apparatus of claim 32 wherein the mounting element is an adhesive material.

* * * * *

UNITED STATES PATENT AND TRADEMARK OFFICE
CERTIFICATE OF CORRECTION

PATENT NO. : 6,953,432 B2
DATED : October 11, 2005
INVENTOR(S) : Eugene C. Schiefer It is certified that error appears in the above-identified patent and that said Letters Patent is hereby corrected as shown below:

Column 3,
Line 2, the number "100" is incorrect, please replace with the number -- 110 --.

Signed and Sealed this

Thirteenth Day of December, 2005

JON W. DUDAS
*Director of the United States Patent and Trademark Office*